United States Patent [19]

Dworak et al.

[11] Patent Number: 5,032,215
[45] Date of Patent: Jul. 16, 1991

[54] METHOD OF ETCHING CERAMIC FRICTIONAL OR SEALING ELEMENTS

[75] Inventors: Ulf Dworak, Baltmannsweiler; Dieter Fingerle, Hochdorf; Kilian Friederich, Plochingen; Hans Olapinski, Aichwald, all of Fed. Rep. of Germany

[73] Assignee: Feldmühle Aktiengesellschaft, Duesseldorf, Fed. Rep. of Germany

[21] Appl. No.: 273,975

[22] Filed: Sep. 7, 1988

Related U.S. Application Data

[62] Division of Ser. No. 925,089, Oct. 24, 1986, abandoned.

[30] Foreign Application Priority Data

Feb. 26, 1985 [DE] Fed. Rep. of Germany ....... 3506691
Feb. 25, 1986 [DE] Fed. Rep. of Germany ............ PCT/EP86/00093

[51] Int. Cl.$^5$ ............................................. C25F 3/00
[52] U.S. Cl. .................................. 156/625; 156/667; 252/79.2
[58] Field of Search ............... 156/667, 641, 665, 625; 252/79.2; 277/233, 224

[56] References Cited

U.S. PATENT DOCUMENTS 3,833,414  9/1984  Grisik et al. ...................... 252/79.2
3,926,443  12/1975  Fenerty et al. ..................... 277/96.2
3,964,942  6/1976  Berkenblit et al. ................ 252/79.2
3,970,319  7/1976  Carroll et al. ..................... 277/233
4,381,968  5/1983  Singh ................................. 252/79.2
4,535,376  8/1985  Nomura et al. .................... 360/126
4,675,123  6/1987  Tsunooka et al. ................. 252/62.9
4,693,481  9/1987  Quinn ................................. 277/224
4,759,554  7/1988  Kemp et al. ........................ 277/74
4,816,114  5/1989  Held ................................... 156/582

FOREIGN PATENT DOCUMENTS 2108341  10/1972  Fed. Rep. of Germany .
3213378  10/1983  Fed. Rep. of Germany .
1126771  9/1968  United Kingdom .

Primary Examiner—Richard V. Fisher
Assistant Examiner—John J. Bruckner
Attorney, Agent, or Firm—Felfe & Lynch

[57] ABSTRACT

Combinations of frictional and sealing elements made from hard substances, such as sintered aluminum oxide, are ground and lapped at their surfaces of engagement. At least one surface has at least some micro-blurred areas. The micro-blurring is produced by chemical etching. Phosphoric acid can be used as the chemical etching, and in thermal etching, the etching temperature is between 1400° and 1560° C.

2 Claims, 15 Drawing Sheets

100 μm

100 μm

10 μm

100μm

100μm

10μm

100 μm

100 μm

10 μm

RZ 2,77 μm
RT 4,20 μm
RA 0,08 μm

RZ 2,93 μm
RT 5,37 μm
RA 0,13 μm

RZ 3,36 µm
RT 6,81 µm
RA 0,12 µm

20 μm

5 μm

2 μm

Silicon Carbide
Sandblasting Grits

20 μm

METHOD OF ETCHING CERAMIC FRICTIONAL OR SEALING ELEMENTS

This is a division application of application Ser. No. 925,089, filed Oct. 24, 1986, now abandoned. A related application Ser. No. 244,613, filed Sept. 9, 1988, now abandoned, is also a continuation of Ser. No. 925,089, filed Oct. 24, 1986.

The invention relates to a matching together of frictional or sealing elements made of hard substances, especially from sintered aluminum oxide, in which at least two elements are in contact with one another, at least one of the elements being a dynamic element and the other the static element, and the surfaces in contact are ground and lapped to achieve high dimensional accuracy and smoothness.

The term, "frictional elements," as used in conjunction with the present invention, is to be understood to refer both to planar surfaces sliding one on the other, and to bushed bearings and shafts for rotating assemblages. The term, "sealing elements," as used in conjunction with the invention, is to be understood to mean only those sealing elements which are at least sometimes in movement, that is to say, mechanical bearing rings on the one hand, but also parts for fittings such as ballcocks and valve seats or sealing disks for sanitary fittings.

In all of these assemblages the need exists for reducing the friction of the parts which slide one on the other, and in some cases form seals with one another, without involving leakage problems. Especially complicated, however, are the problems involved in sealing disks for sanitary fittings, since here not only do continually changing thermal conditions occur, but also allowance must be made for long periods of standstill between operating cycles. The invention will therefore be dealt with below in connection with sealing disks for sanitary fittings, without, however, being limited thereto.

For the operation of sanitary fittings, especially single-lever faucets which operate with ceramic disks sliding sealingly one on the other, very different forces are needed. The opening and closing of a faucet of this kind is performed by raising and lowering the operating lever, and by reason of the very great leverage—generally more than 10:1—the user of the faucet is not greatly aware of the force that must be used for that purpose, but the stress to the active parts of the valve is very great. On account of the more direct application of the effort, the user of the faucet is much more aware of the rotational force needed to control the temperature of the water. Any stiffness in the faucet in this area is also very problematic for the user because it makes the fine adjustment of the temperature more difficult. A third force which must be taken into consideration by the user of the faucet, and which is always surprising to the user, is the so-called "break-loose" force. This break-loose force is quite high, especially after the faucet has been unused for a long time, and amounts to a multiple of the forces referred to above as the working forces which are required for producing the rotation or the opening or closing of the faucet. It is based on the greater surface-to-surface adhesion and forms the actual criterion of the quality of the faucet, especially when the sealing disk is to be operated by handles made of plastic, as is the case in more or less all modern faucets in which the sealing disks are held together in plastic cases in the form of cartridges. For the sake of completeness it must be explained that this break-loose force must, of course, also be taken into consideration in the operation of sliding ring seals or friction bearings; in other words, the same phenomenon is involved.

For the solution of this problem the proposal has been made in British Patent 627,436 to put cavities in the sealing disk and fill them with grease. A similar proposal for sliding ring seals is contained in German Offenlegungsschrift 29 28 504; German Offenlegungsschrift 32 11 409 also makes such a proposal and again is addressed to the arrangement of a sealing disk. German Patent 2 99 125 also relates to such friction bearings, namely friction bearings having roughened surfaces in contact, which stick less easily due to the roughening and are less sensitive to loss of lubrication, because the lubricant can more easily gather and stay in the surfaces in contact. French Patent 1597609 describes and also shows surfaces which are provided with recesses, but does not go beyond what is known from the publications cited above. British Patent 1126771 discloses knurled friction bearings in which one friction bearing has an aluminum oxide coating and the other a cadmium coating. The knurling runs between 50 and 90 degrees to the direction of movement, the indentations having a depth of 0.1 mm and a distance apart of 1.5 mm. All these publications set out from the fact that the contact surface area must be reduced and that grease must be embedded in the recesses thus formed, which are established in the form of easily visible pockets in the macro range, thereby additionally reducing the friction. Practice has shown, however, that on the one hand the grease is flushed out from these relatively large recesses by the flow and thus they can no longer serve their purpose. Instead, after passing through the fitting the grease becomes an undesirable contaminant in the liquid being pumped. Since furthermore, on account of the "waffle pattern" created in the sealing disk, only narrow strips are left which then must perform the sealing function, and damage can easily be done in the area of these strips. This creates the danger of leakage of the fitting or that the sealing disk will be unable to serve its purpose.

Sliding-contact bodies are disclosed by DE-OS 32 13 378 which are provided with chambers which can be cooled or heated. The object of this is to achieve a controllable corrugation of the sliding-contact body, which is no more than simply orientated and can be of the order of magnitude of a few millimeters, since the chambers would otherwise be too small and thus unable to serve their purpose of heating or cooling separate areas.

The electro-erosion of friction surfaces of sliding bearings to produce craters or saucer-shaped depressions is found in DE-GM 18 58 666. These craters or depressions serve to hold oil or grease to better retain the lubricant film. Aside from the fact that it is decidedly difficult to apply electro-erosion to ceramic surfaces, sharp-edged craters are produced, which likewise are in the macro range.

It is therefore the object of the present invention to reduce insofar as possible the force required for the operation of a sliding or sealing element combination without impairing the water-tightness of the sealing elements.

In a pair of sliding and sealing elements according to the introductory part of the claim, this object is achieved by subjecting at least one surface of one element to a micro-blurring treatment. It is not particularly important whether the static element or the dynamic element is given the micro-blurring treatment; it is important only that at least one of the surfaces in contact be micro-blurred in this manner. It is also possible, of course, to provide both of the surfaces in contact with this micro-blurring treatment and thus to achieve still greater ease of movement. The only condition in all three cases is that the ratio of the load-bearing area percentages be within the ordinary range so that leakage will not be caused by combining two elements having a low load-bearing area percentage.

The term, "micro-blurring," in conjunction with the present invention, is to be understood to mean both the blurring or rounding of the grain boundaries and the blurring of pores, whereby the depths of the recesses formed by such blurring will range between 0.05 and 3.00 microns. The etch depth depends, of course, on the grain size that is present in the surface. In the case of a fine grain, the lower range, i.e., the range between 0.05 and 0.2 microns is involved, and in the case of a coarser grain it is the upper range, i.e., depths between 0.5 and 3.0 microns will occur.

As it can be seen in FIG. 1 below, the bottom limit of the liquid-tightness of a pair of sealing elements is where the load bearing area percentage in the one surface amounts to 40%, and in the other is 80%. These percentages include a safety factor, so that machining tolerances will be unable to have a negative effect on the sealing ability of the combination.

The load-bearing area percentage can be largely controlled in the lapping process by selecting the size of the diamond grit. However, as scanning electron photomicrographs show, sharp-edged pores are normally formed in this machining operation, by individual grits or fragments of the grits breaking out. These microcavities which are always present in the lapped surface of sintered oxide ceramics have a great influence on the forces produced by the movement of the pair of elements, since they are largely determined by the load-bearing area percentage.

Surprisingly, it has now become possible to reduce the friction considerably by blurring the pores and the individual grains at the grain boundaries, i.e., by rounding off the sharp edges of the pores and of the grain boundaries of the structure, so that, on a microscopic scale, a kind of orange-peel texture is formed. This blurring occurs mainly in the area of the grain boundaries, so that it is possible through additives used in the production of the starting mixture for the sliding or sealing elements to have different hardnesses in the sintered product and thus to achieve, in the lapping or polishing operations, pores that will be already rounded, so that, looking at the entire surface, a micro-blurring is achieved.

The rounding of the pores depends, of course, not only on the grain size of the sintered material, but also very importantly on its chemical composition. It has thus been possible in the meantime to achieve excellent results by using silicon carbide as the sliding or sealing element and to perform the lapping with a certain size of diamond grits. On account of the entirely different chemical composition involved when sintered aluminum oxide is used, this method has not been successful as yet, so that in this case, according to an advantageous further development of the invention, the surface was chemically etched. The duration of the etching treatment is best between 1 and 5 minutes, the temperature between 200° and 250° C. and the etchant is phosphoric acid.

The materials of which the sliding or sealing elements are made are known, as are the sliding and sealing elements themselves. For example, in German Patent 31 16 801 a valve disk of special silicon carbide material is described, and German patents 12 91 956 and 12 82 377 as well as German OS 23 49 131 relate to sealing elements on the basis of aluminum oxide ceramic. The applicant's previous patent application, German OS 30 25 596, relates to sealing elements which contain, in addition to aluminum oxide, up to 25% of zirconium and/or hafnium oxide. German Patent 88 02 41 furthermore discloses the anodic etching of a friction surface; this process, however, is not applicable to ceramic, which is a nonconductor.

According to a preferred embodiment of the invention, the etching is performed thermally, the temperatures being preferably between 1400° and 1560° C. and the treatment time 3 to 7 hours.

According to an advantageous embodiment of the method according to the invention, the lapping is followed by treating the contact surface by sandblasting. The sandblasting, in the meaning of the present invention, is especially bombardment with silicon carbide particles, not the use of ordinary sand, metal, shot or glass beads, as disclosed, for example, in German OS 21 08 341 or in "Metalloberflaeche," 7/1974, p. 270. Sandblasting ceramic surfaces with glass beads does not result in any ablation of material, since the glass bead deforms against the hard ceramic surface. Instead, what occurs is a coating on the ceramic, making articles sandblasted with glass unusable.

The invention will be explained below with the aid of examples in the form of graphs and scanning electron photomicrographs.

FIG. 1 shows the boundary regions of the combinations of load-bearing area percentages for the control disk and valve disk in mixing faucets. The control disk is the dynamic element, and the valve disk is the static element. The diagram shows clearly that combinations below the 80% line are leaky.

FIG. 2 presents an overview of the friction values of different combinations and different surface qualities of sealing disks which move against one another under different conditions. What was measured was the friction number $\mu$ in the combinations, aluminum oxide against aluminum oxide and aluminum oxide against silicon carbide at different roughness depths Ra, different load-bearing area percentages TA both dry, i.e., without grease and without water, and wet with water only, and wet with water plus additional grease lubrication. The friction number $\mu$ was obtained by the formula $$\frac{F \frac{1}{2} N}{F N}$$

wherein $F\frac{1}{2}$ corresponded to the average displacement force and F to a constant loading of 305N at a running time of 25,000 cycles.

FIGS. 3 to 17 contain 3 scanning electron micrographs each, with enlargements of 100, 300 and 1000 diameters, all relating to a sealing disk. With each page there is associated the number of a characteristic curve, which is to be seen both in the curves and in the table.

FIGS. 3 to 5 correspond to characteristic 4. This sealing disk (static element) has a load-bearing area percentage of 78%. It is a disk of sintered aluminum oxide which was polished after grinding. FIGS. 15, 16 and 17 are to be considered in comparison with these, which are materially identical and given mechanically identical treatment, but this treatment was followed by chemical etching for 3 minutes at 230 degrees in phosphoric acid, so that, as shown by the micrographs, an entirely different surface configuration results. The load-bearing area percentage was reduced by the etching to 40%, and the friction number $\mu$ for the dynamic friction was reduced to 0.11 and $\mu0$ for the static friction was reduced to 0.18. The disk in contact, i.e., the dynamic element, was a disk of polished aluminum oxide with a load-bearing area percentage of 71%.

FIGS. 6, 7 and 8 also show a static element, FIG. 6 showing a 100× magnification, FIG. 7 a 300× and FIG. 8 a 1000× magnification. The disk is a sealing disk of polished aluminum oxide whose load-bearing area percentage amounts to 73%. The specimen corresponds to characteristic No. 3.

FIGS. 9, 10 and 11 are also scanning electron micrographs in 100×, 300× and 1000× magnifications. This is again a sealing disk of polished aluminum oxide. The bearing percentage is 45%, and the micrographs correspond to characteristic curve No. 2.

FIGS. 12, 13 and 14 have the same enlargements, i.e., 100×, 300× and 1000×. This also is a sealing disk of polished aluminum oxide, but it was thermally etched after being polished. This thermal etching was performed at a temperature of 1480 degrees over a period of 5 hours. Afterward the load-bearing area percentage was 43%, i.e., it was substantially below the original percentage given in characteristic No. 3.

FIGS. 18 and 22 correspond to characteristic curve No. 3. FIG. 18 represents surface values in the plane of measurement: total, and polished before the test. The difference is to be seen in the fact that the aluminum oxide was tested after polishing without further treatment. FIG. 22 represents surface values in the plane of measurement: total, and thermally etched before the test. In FIG. 22 the previously described thermal etching was performed before micrographing the surface quality.

It is much the same in FIGS. 20 and 21. The characteristic curve No. 4 relates, according to FIG. 20, to the polished material and FIG. 21 to the polished and chemically etched material. The etching was performed for 3 minutes at a temperature of 230° C. The etchant was phosphoric acid.

FIG. 19, corresponding to characteristic curve No. 2, relates to a polished aluminum oxide with a load-bearing area percentage of 45%. FIG. 19 represents surface values in the plane of measurement: total, and polished before the test. As in the case of characteristic No. 1, this is a blank test. In characteristic 1, the load-bearing area percentage is 70%, to permit the frictional characteristics of the individual product to be defined more accurately in relation to one another. The values listed in the table show that the friction numbers $\mu$ for the dynamic friction according to characteristics 1 and 2 drop from 0.24 and 0.18 to 0.13 and 0.11, respectively, and the friction number $\mu0$ for the static friction drops from 0.38 and 0.24 to 0.20 and 0.18, respectively. In all these cases, sealing disks of aluminum oxide ran against sealing disks of the same material, but they had different bearing percentages. Characteristics Nos. 5 and 6, on the other hand, relate to the combination of disks of aluminum oxide of different load-bearing area percentages, which rub against sealing disks of silicon carbide also having different load-bearing area percentages. This silicon carbide is a material which, as described above, was lapped and polished with a special diamond dust, resulting also in a rounding of the pores, which led to the low friction numbers of 0.09 and 0.07 for sliding friction and 0.18 and 0.11, respectively, for the static friction.

Figure 25A:
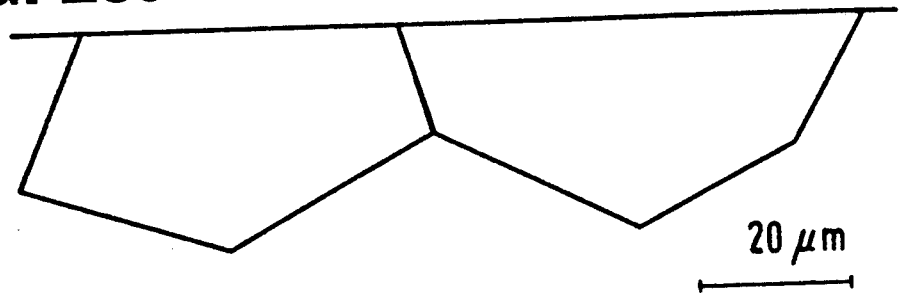
Figure 25B:
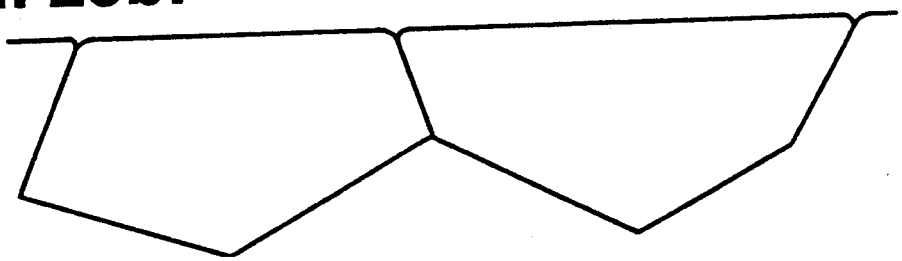
Figure 26A:
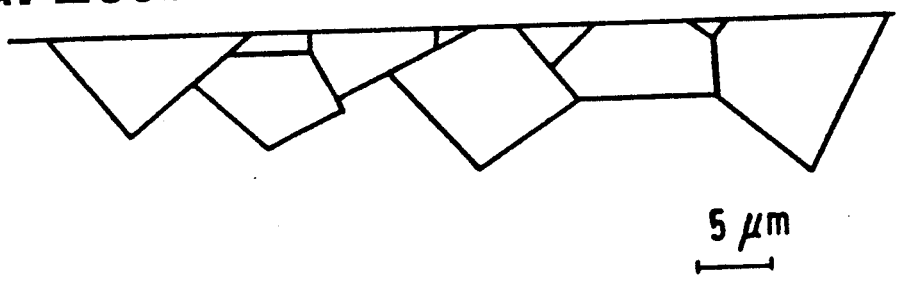
Figure 26B:
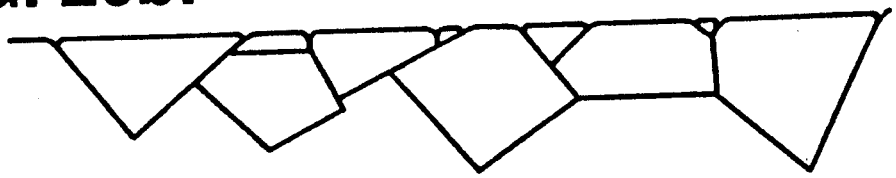
Figure 27A:
Figure 27B:
Figure 28A:
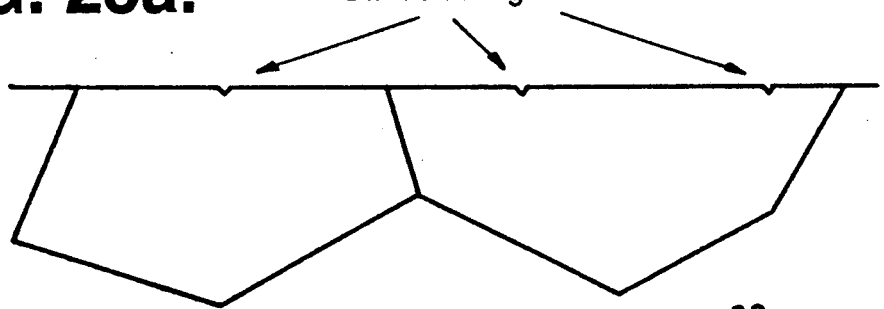
Figure 28B:
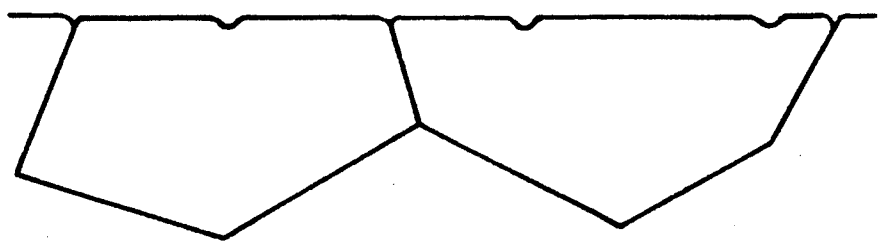

FIGS. 25a to 28b show diagrammatically how the structure is affected, based on different structural grain sizes. In each of these the surface quality before treatment is shown at (a) and the surface quality after treatment, i.e., after the chemical or thermal etching, is shown at (b). FIGS. 25A and 25b represents a coarse structure, FIGS. 26a and 26b a medium, and FIGS. 27a and 27b a fine structure. In FIGS. 28a and 28b coarse grain is again shown, but one which has been roughened, at the points indicated by arrows, by silicon carbide sandblasting at (a) and then rounded by subsequent etching as represented at (b).

Figure 1:
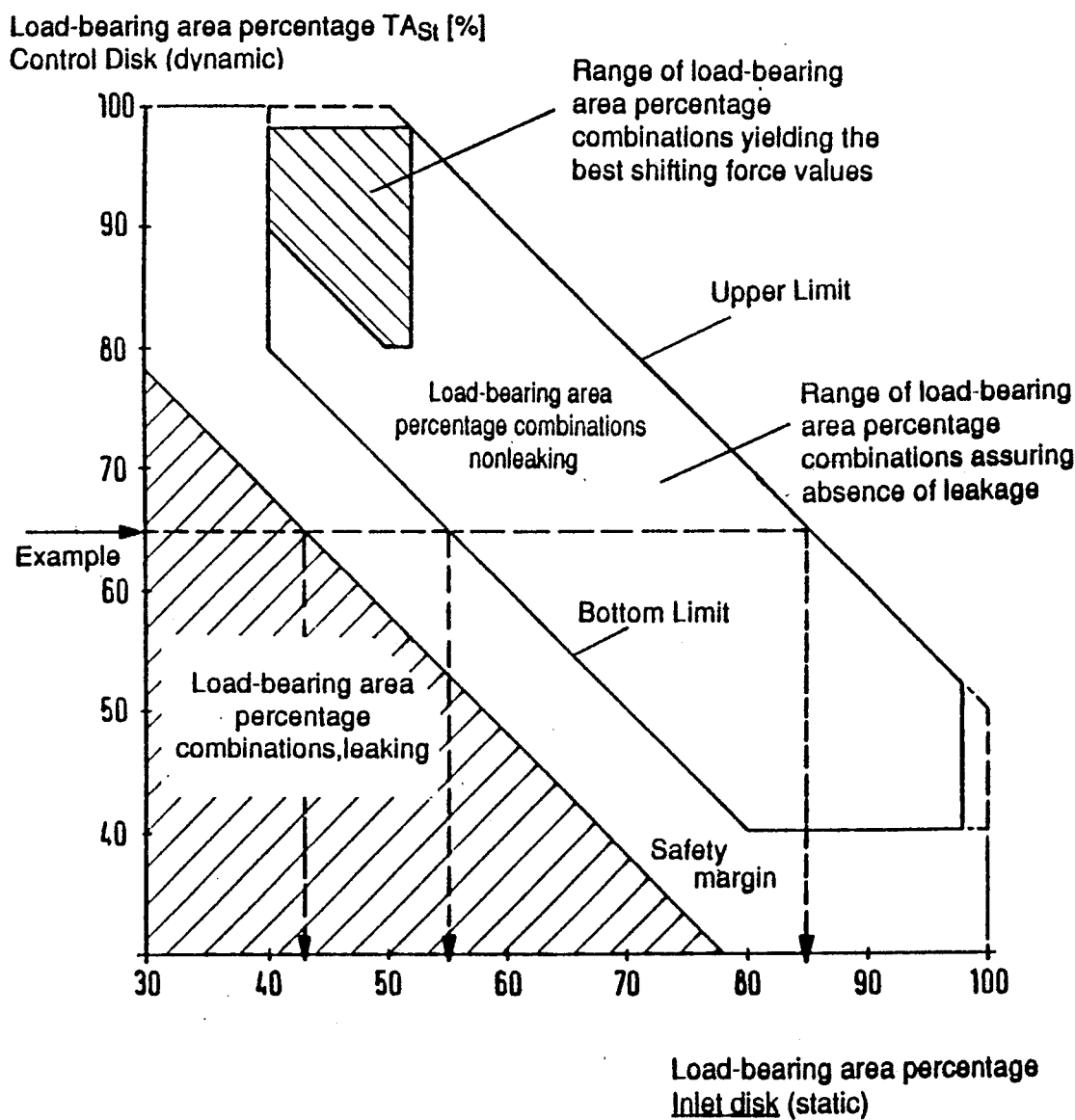
Figure 2:
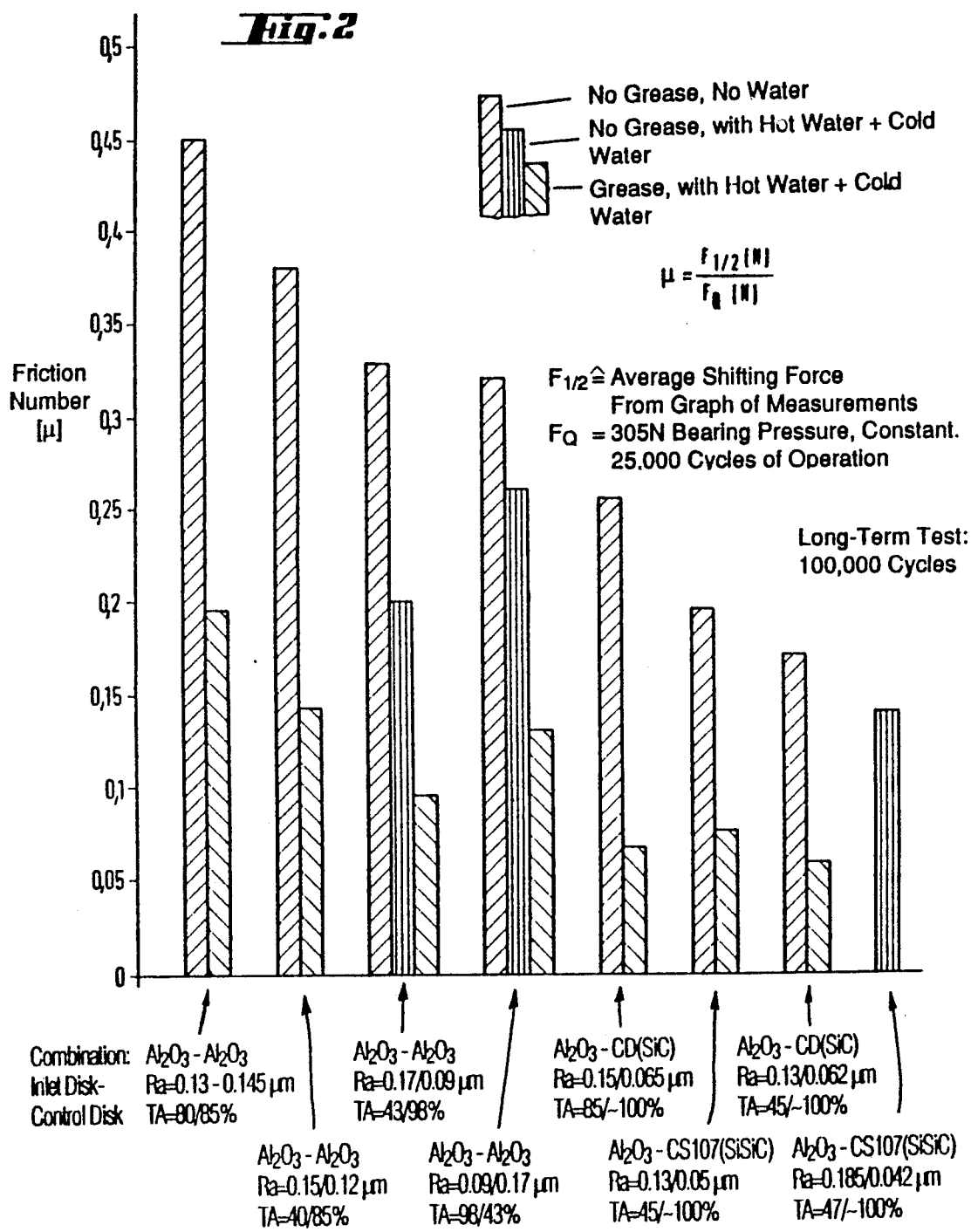
Figure 3:
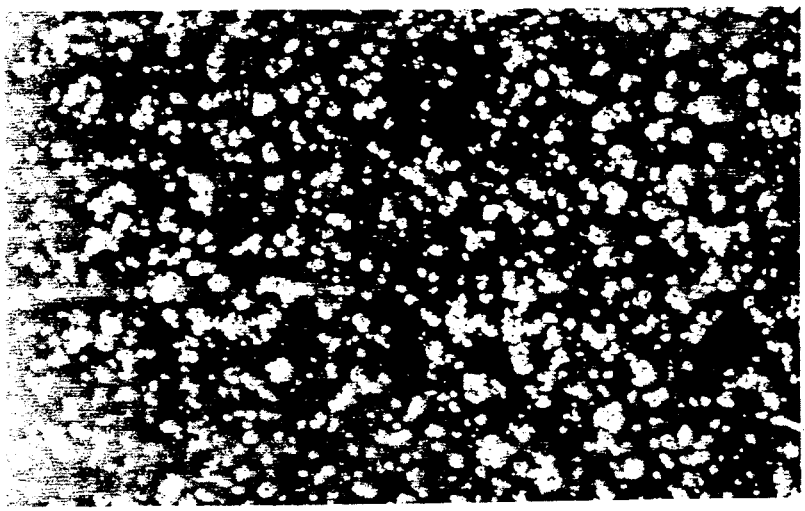
Figure 4:
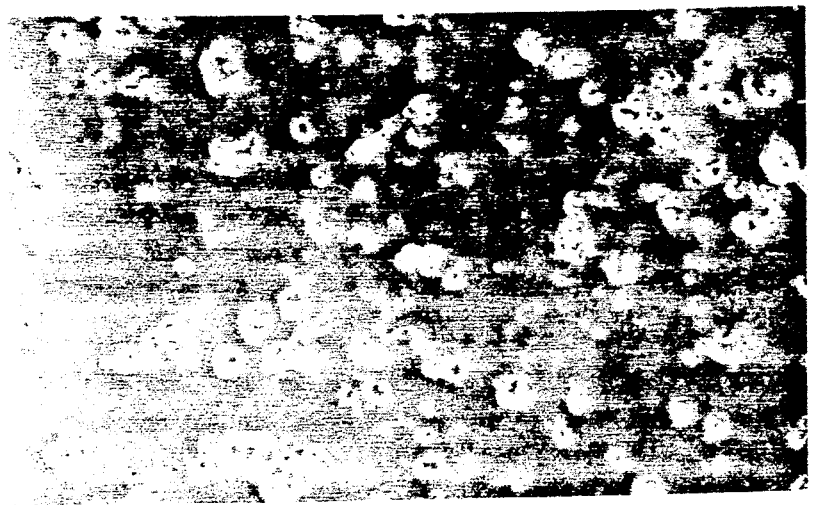
Figure 5:
Figure 6:
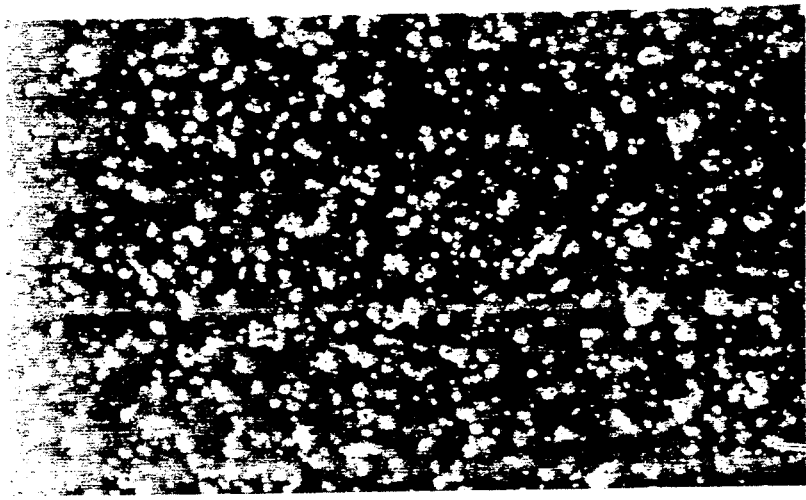
Figure 7:
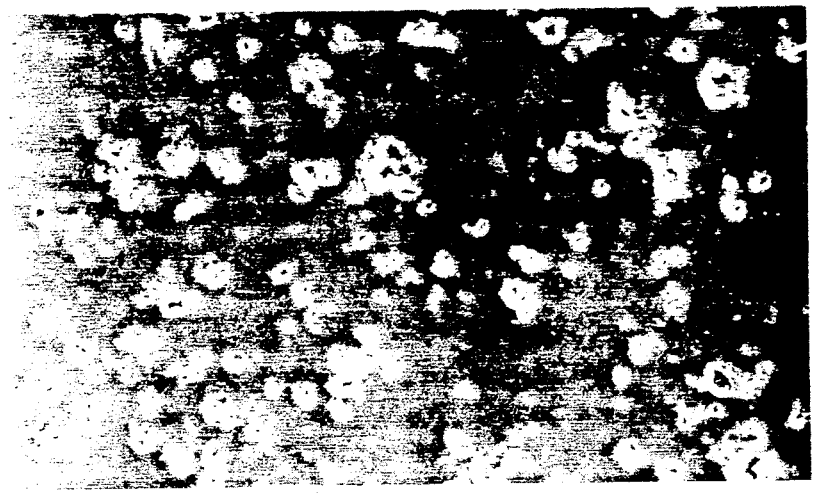
Figure 8:
Figure 9:
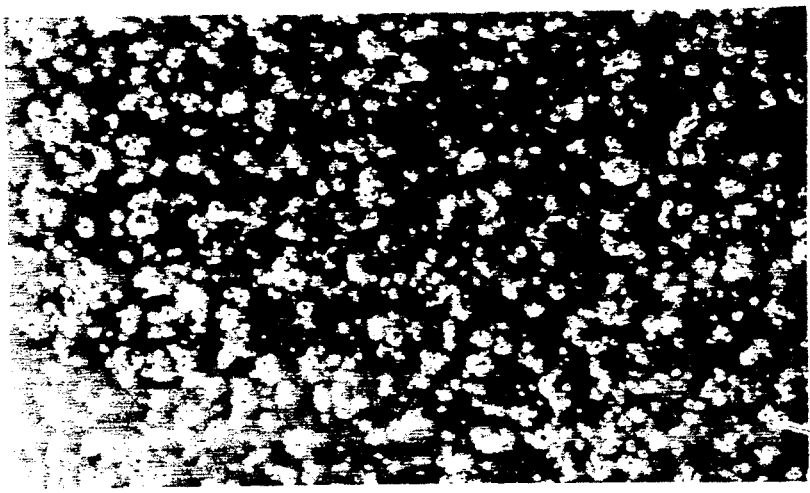
Figure 10:
Figure 11:
Figure 12:
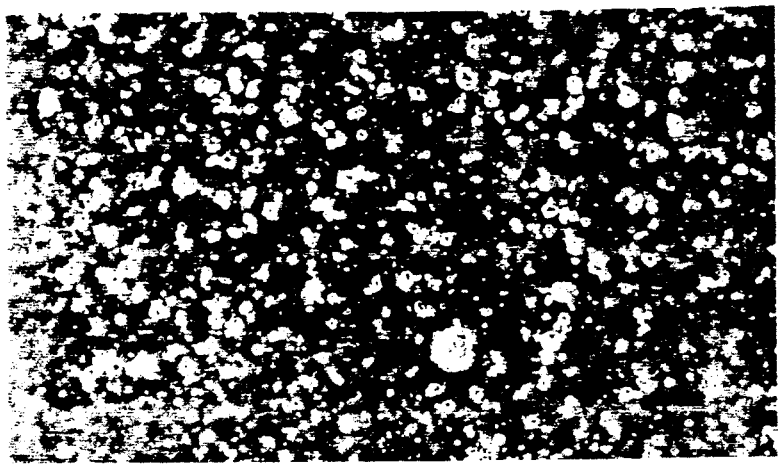
Figure 13:
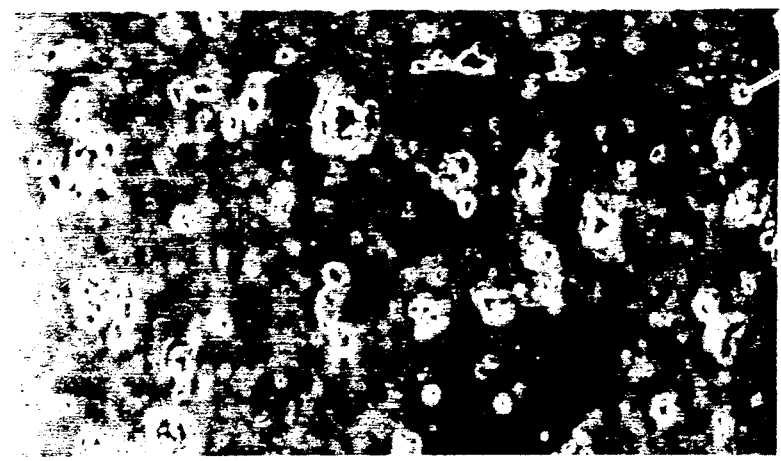
Figure 14:
Figure 15:
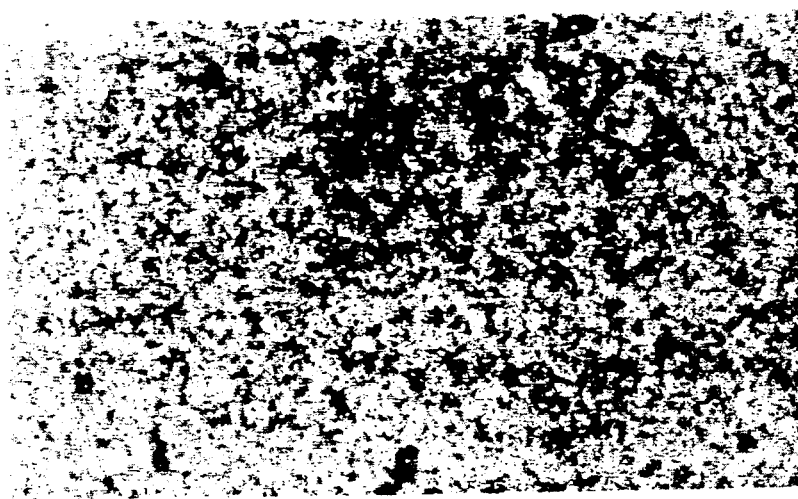
Figure 16:
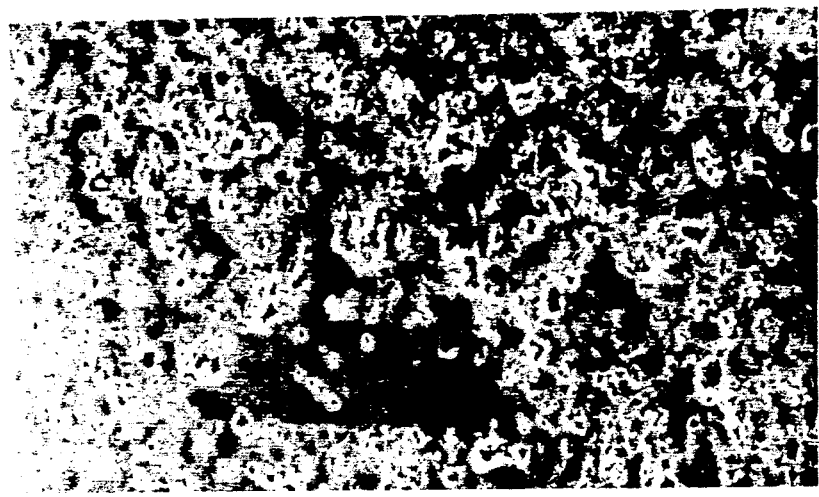
Figure 17:
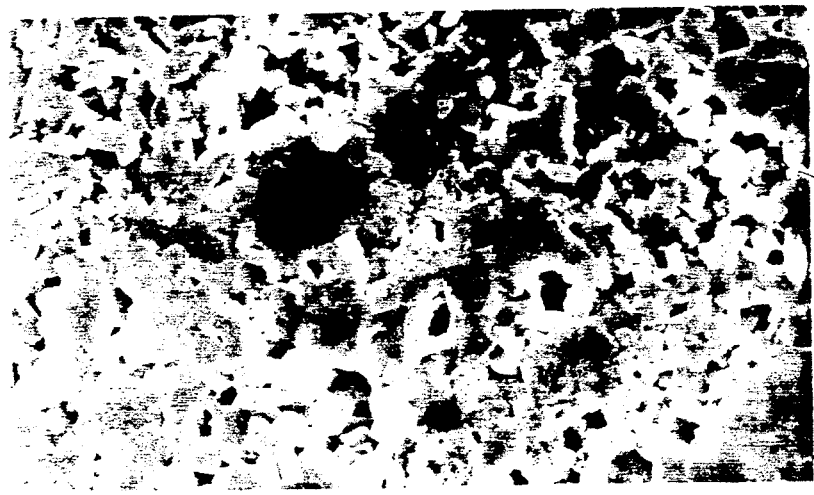
Figure 18:
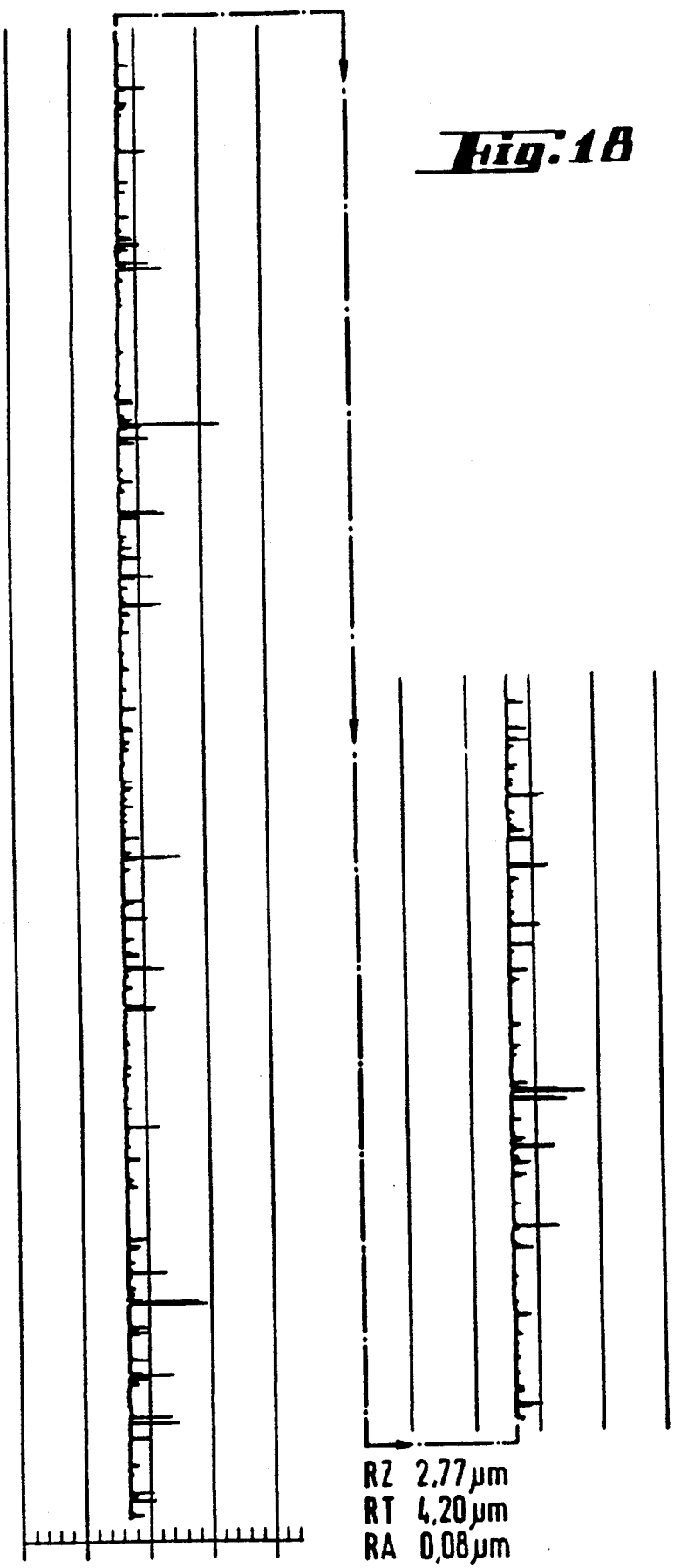
Figure 19:
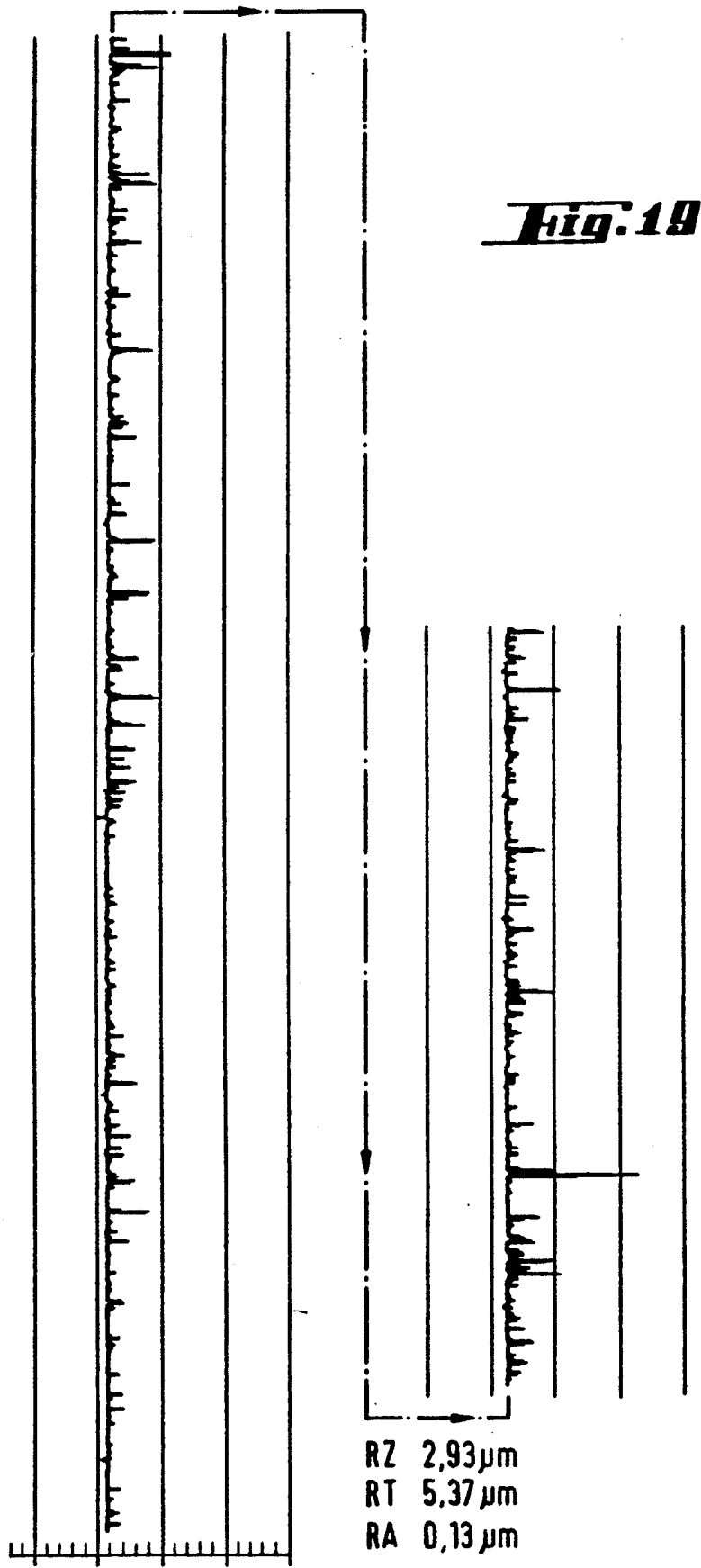
Figure 20:
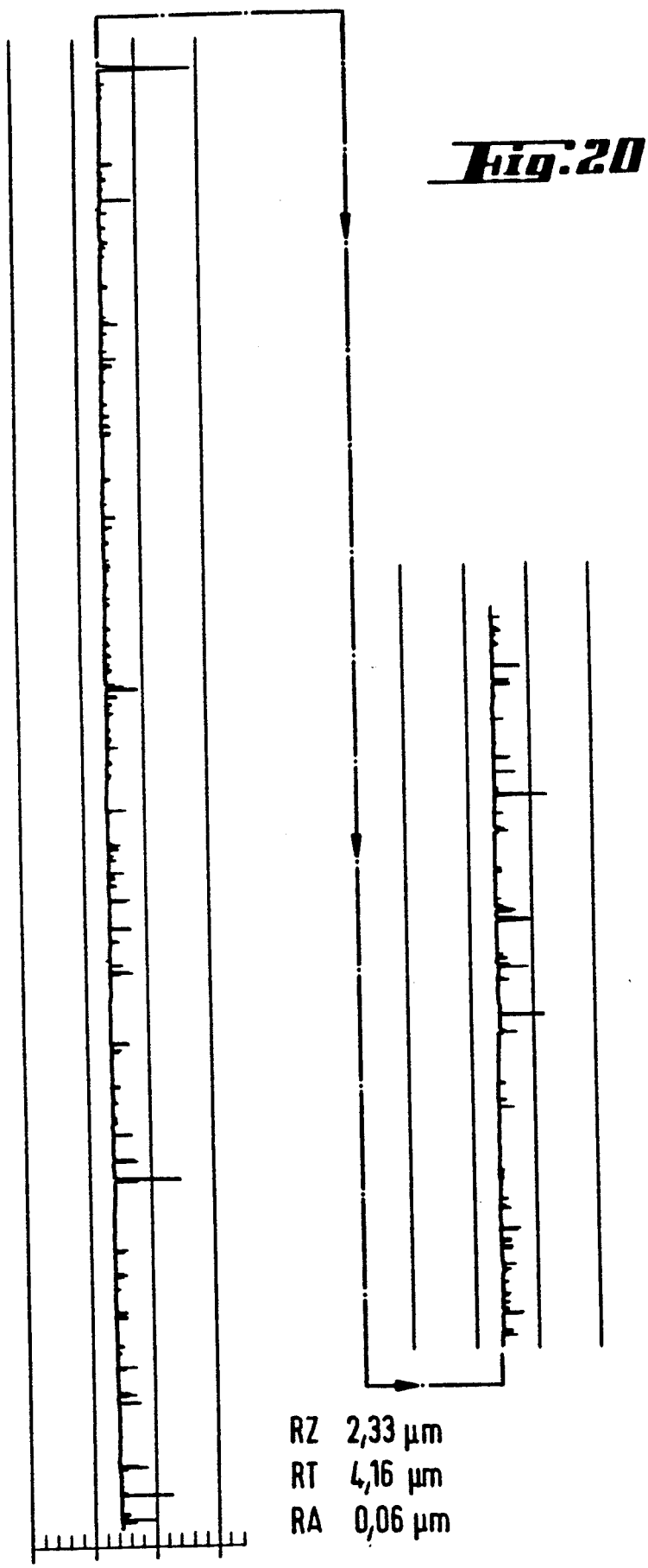
Figure 21:
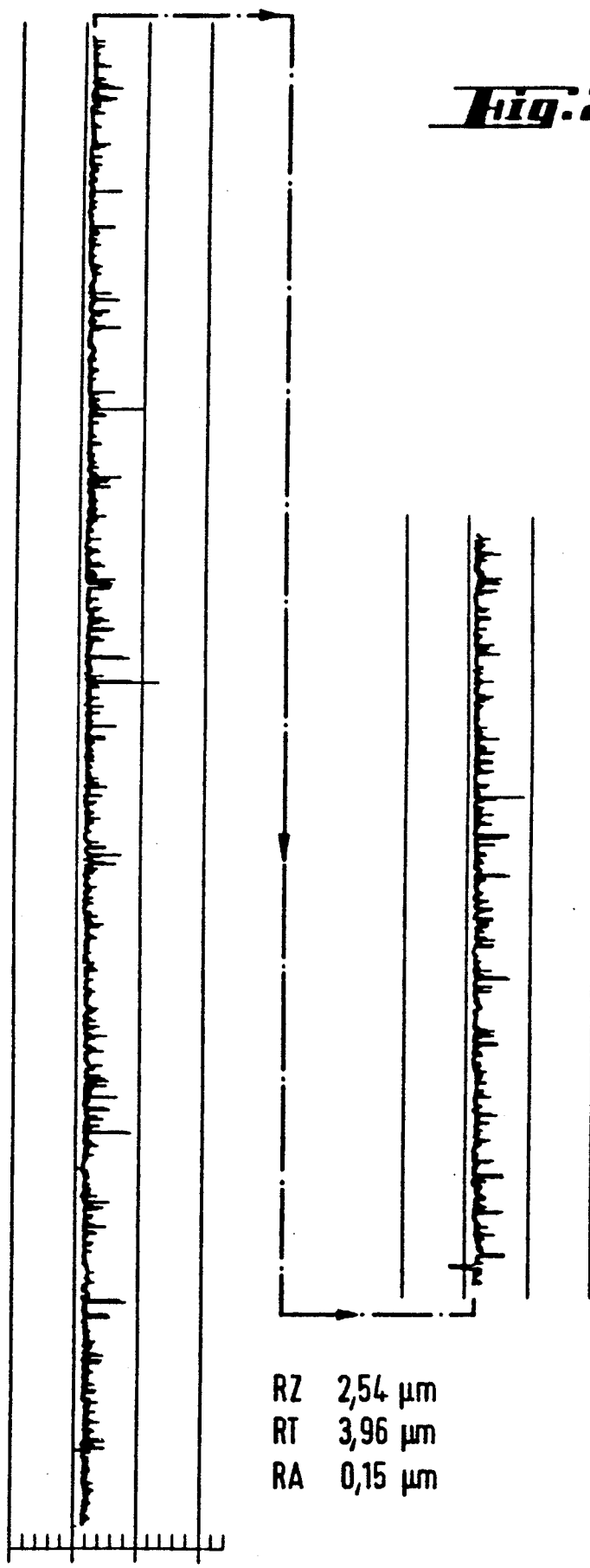
Figure 22:
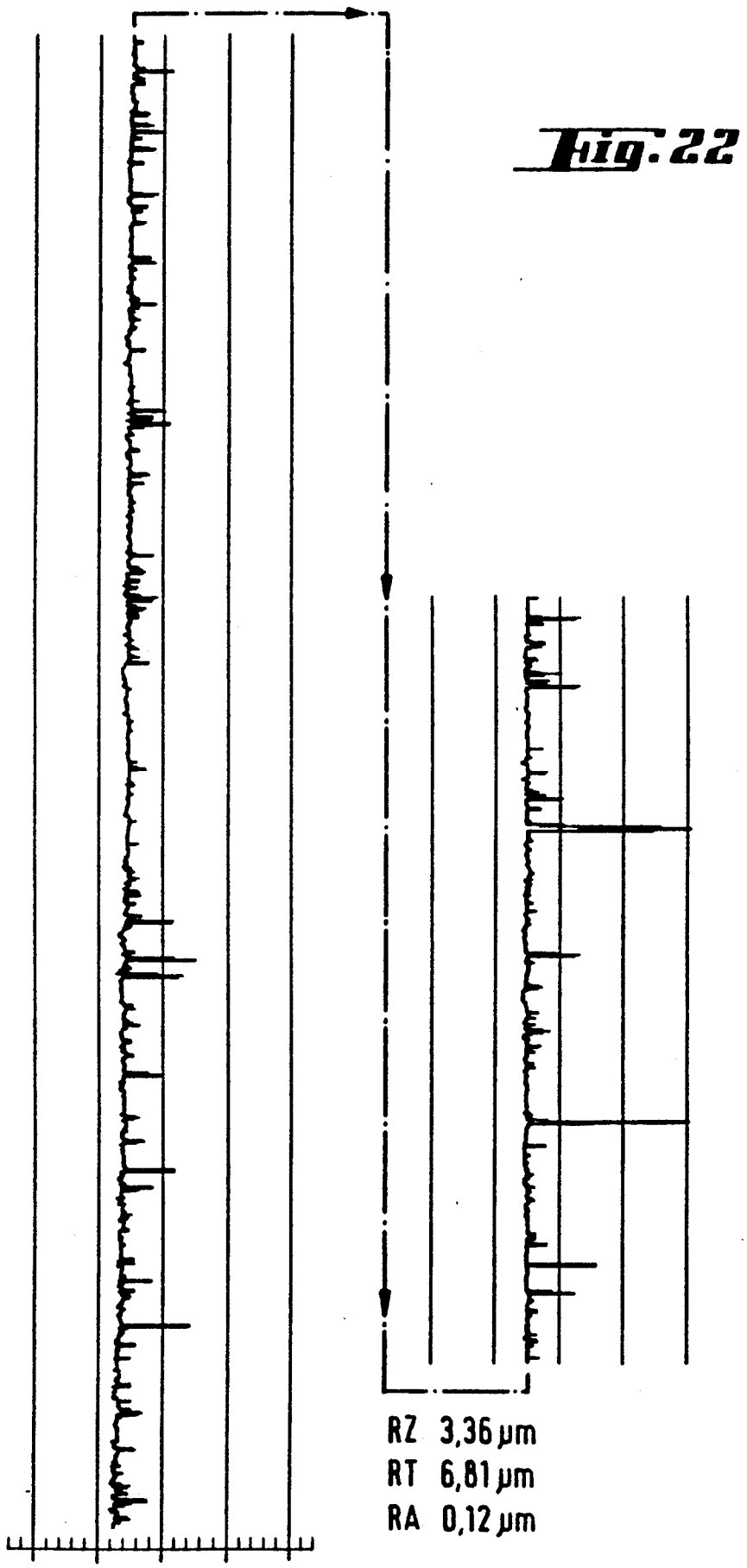
Figure 23:
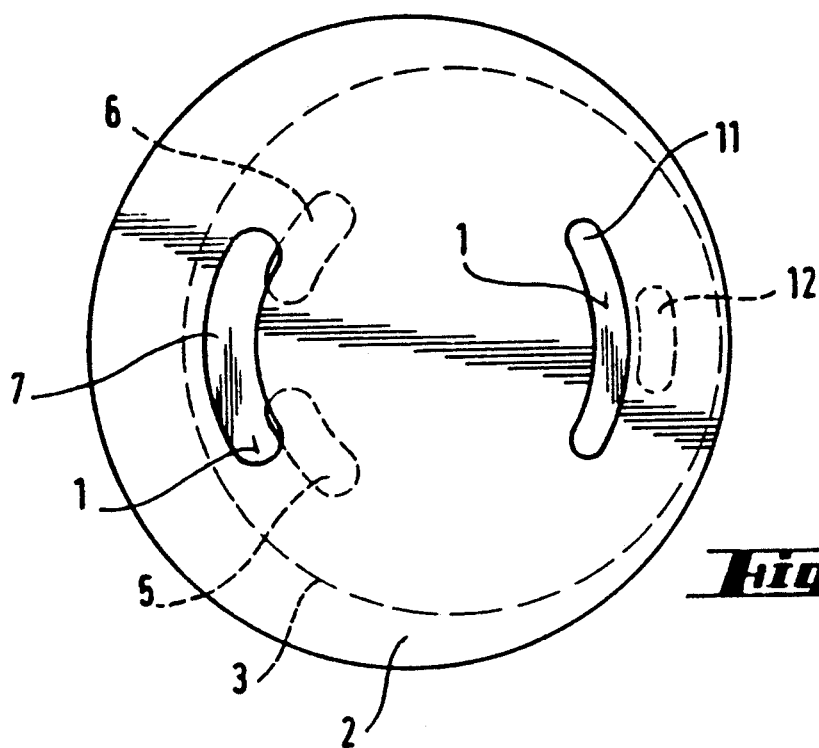
FIG. 23 shows a plan view of a sealing disk combination.
Figure 24:
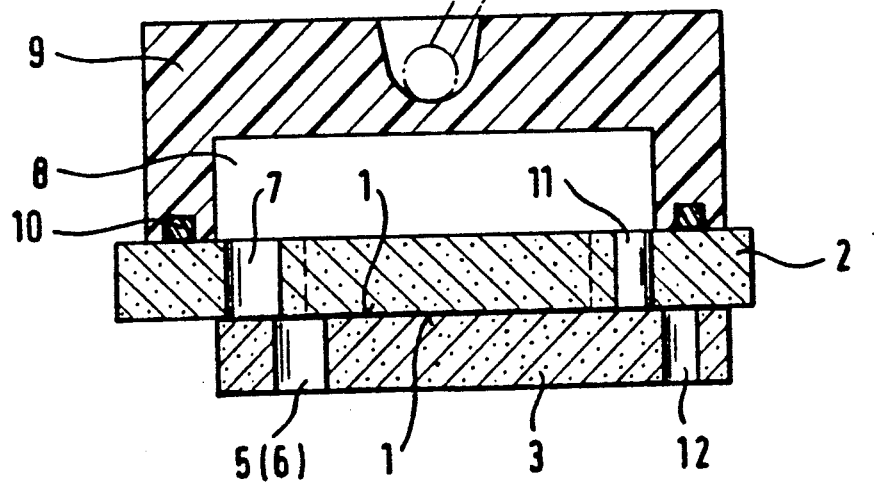
FIG. 24 shows the same sealing disk combination in a cross-sectional side view.

The static element 3 is a valve seat disk, and the dynamic element 2 is a control disk. The two elements 2 and 3 have each a contact surface 1, one in contact with the other, and having a high degree of micro-blurring. As represented in FIG. 23, the cold water enters through the cold-water inlet 5 and the hot water through the hot-water inlet 6, both of which are in the static element 3 and, after running through the passage 7 which is contained in the dynamic element 2, it passes into the mixing chamber 8. The mixing chamber 8 is formed by a plastic hood 9 which is sealed against the dynamic element 2 by the O-ring 10. After passing through the mixing chamber 8, the mixed water passes through the water outlet 11 in the dynamic element 2 and the mixed water outlet 12 in the static element 3. The mixing ratio is varied by rotating the operating lever 13, i.e., the passage 7 is shifted by turning it clockwise far beyond the hot water inlet 6, so that more hot water enters into the mixing chamber 8. By tilting the lever 13 the rate of flow of the water is regulated, i.e., passage 7, and parallel with it the outlet 11, overlaps the hot water inlet 6 or cold water inlet 5 and the outlet 11 overlaps the mixed water outlet 12 by a more or less great amount.

| Characteristic No. | Inlet disk E surface quality | TA % | Ra μm | Rt μm | Rz μm | LB | Friction numbers based on displacement forces | | Counter-disk S (control disk) | |
|---|---|---|---|---|---|---|---|---|---|---|
| | | | | | | | Sliding friction $\mu$ | Static friction $\mu_o$ | | |
| 1 | Al$_2$O$_3$ polished | 70 | 0.08 | 4.49 | 2.63 | <1 | 0.24 | 0.38 | Al$_2$O$_3$ | TA = 70% |
| 2 | Al$_2$O$_3$ polished | 45 | 0.13 | 5.37 | 2.93 | <2 | 0.18 | 0.24 | Al$_2$O$_3$ | TA = 85% |

-continued

| Characteristic No. | Inlet disk E surface quality | TA % | Ra μm | Rt μm | Rz μm | LB | Friction numbers based on displacement forces | | Counter-disk S (control disk) | |
| --- | --- | --- | --- | --- | --- | --- | --- | --- | --- | --- |
| | | | | | | | Sliding friction $\mu$ | Static friction $\mu_o$ | | |
| 3 | Al$_2$O$_3$ polished after thermal etching at 1480° C./5 h | 73 43 | 0.08 0.12 | 4.20 6.81 | 2.77 3.36 | <1 — | — 0.13 | — 0.20 | Al$_2$O$_3$ | TA = 76% |
| 4 | Al$_2$O$_3$ polished after chemical etching at 230° C./3 min H$_3$PO$_4$ | 78 40 | 0.06 0.15 | 4.16 3.96 | 2.33 2.54 | <1 <— | — 0.11 | — 0.18 | Al$_2$O$_3$ | TA = 71% |
| 5 | Al$_2$O$_3$ polished | 80 | 0.06 | 4.23 | 2.65 | 1 | 0.09 | 0.18 | CD(SiC) | TA = 66% |
| 6 | Al$_2$O$_3$ polished | 45 | 0.14 | 5.42 | 3.89 | — | 0.07 | 0.11 | CD(SiC) | TA = 60% |

Surface values of characteristic groups 1 to 6 (Extract)
1 = Standard values (series production), friction numbers were computed from the displacement forces (slight movement).

We claim:

1. A method of making a combination of frictional or sealing elements from hard substances in which at least two elements are in engagement with one another, one of the elements being in the form of a dynamic and the other of a static element and the surfaces in engagement are ground and lapped for the achievement of a high dimensional accuracy and smoothness, comprising the steps of providing at least two sintered oxide ceramic elements, grinding said elements, lapping said elements and micro-blurring at least one of said elements by etching wherein after the lapping said etching of said surface in engagement is chemical etching and the etching time amounts to 1 to 5 minutes.

2. Method according to claim 1, wherein the etching temperature is between 200° and 250° C. and phosphoric acid is used as etchant.

* * * * *